March 7, 1967  J. A. EARL  3,307,958
CERAMIC MATERIAL
Filed April 11, 1960

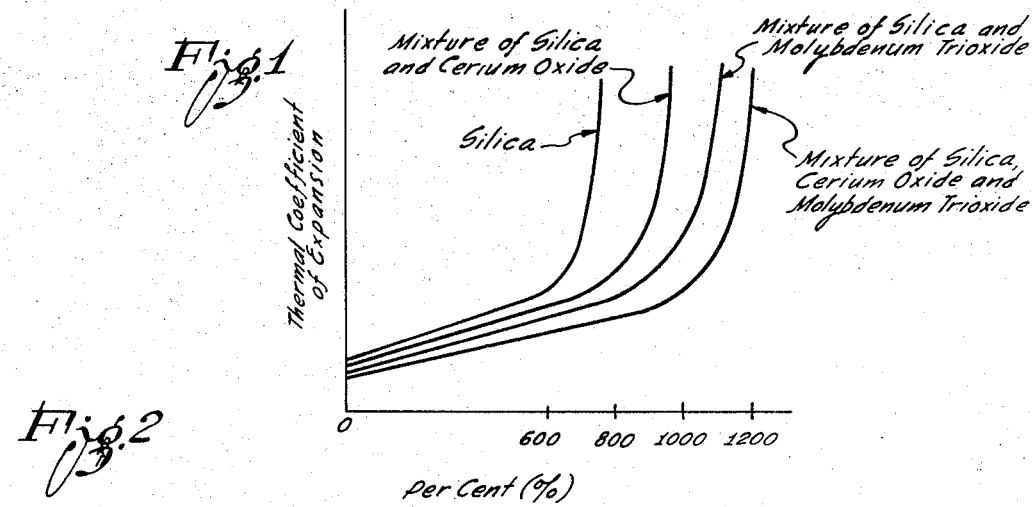

Fig. 1

Fig. 2

| Representative Mixtures | 1 | 2 | 3 | 4 | 5 | 6 | 7 | 8 |
|---|---|---|---|---|---|---|---|---|
| Red Lead | 38 | 50 | 57.2 | 40 | 40 | 42.0 | 47 | 54.3 |
| Barium Carbonate | 17 | 5 | 5 | 10 | 18 | 18.8 | ... | ... |
| Aluminum Oxide | 2 | 2 | ... | 5 | 3 | 1.8 | 2 | 1.8 |
| Bismuth Trioxide | 12 | 10 | 5 | 10 | 10 | 8.9 | 10 | 10.2 |
| Silicon Dioxide | 26 | 30 | 30.8 | 25 | 20 | 26.7 | 30 | 20.2 |
| Cerium Dioxide | 5 | 3 | 2 | 1 | 2 | 2.2 | 1 | 9 |
| Zinc Oxide | ... | ... | ... | ... | ... | ... | 4 | ... |
| Molybdenum Trioxide | ... | ... | ... | 5 | 5 | 2.6 | 3 | ... |
| Lanthanum Oxide | ... | ... | ... | 4 | 2 | 2.6 | 3 | ... |
| Magnesium Oxide | ... | ... | ... | ... | ... | ... | ... | 4.5 |
| Titanium Oxide | ... | ... | ... | ... | 5.0 | ... | ... | ... |
| Zirconium Dioxide | ... | ... | ... | ... | ... | 4.4 | ... | ... |
| Melting Temperature | 1700 | 1550 | 1500 | 1650 | 1675 | 1700 | 1525 | 1400 |

Per Cent (%)

| Representative Mixtures | 1 | 2 | 3 | 4 | 5 | 6 | 7 | 8 |
|---|---|---|---|---|---|---|---|---|
| Lead Oxide | 38.78 | 49.75 | 57.10 | 40.20 | 40.0 | 42.10 | 47 | 54.3 |
| Barium Oxide | 13.90 | 4.00 | 4.00 | 8.05 | 14.0 | 7.07 | ... | ... |
| Aluminum Oxide | 2.10 | 2.15 | ... | 5.17 | 3.0 | 1.86 | 2 | 1.8 |
| Bismuth Trioxide | 12.62 | 10.25 | 5.15 | 10.35 | 10.0 | 9.20 | 10 | 10.2 |
| Silicon Dioxide | 27.34 | 30.80 | 31.70 | 25.88 | 20.0 | 27.58 | 30 | 20.2 |
| Cerium Dioxide | 5.26 | 3.05 | 2.05 | 1.03 | 2.0 | 2.28 | 1 | 9.0 |
| Zinc Oxide | ... | ... | ... | ... | ... | ... | 4 | ... |
| Molybdenum Trioxide | ... | ... | ... | 5.17 | 5.0 | 2.68 | 3 | ... |
| Lanthanum Oxide | ... | ... | ... | 4.15 | 2.0 | 2.68 | 3 | ... |
| Magnesium Oxide | ... | ... | ... | ... | ... | ... | ... | 4.5 |
| Titanium Oxide | ... | ... | ... | ... | 5.0 | ... | ... | ... |
| Zirconium Dioxide | ... | ... | ... | ... | ... | 4.55 | ... | ... |
| Melting Temperature | 1700 | 1550 | 1500 | 1650 | 1675 | 1700 | 1525 | 1400 |

Fig. 3

INVENTOR:
John A. Earl

By Smyth, Roston & Pavitt
Attorneys

United States Patent Office 3,307,958
Patented Mar. 7, 1967

3,307,958
CERAMIC MATERIAL
John A. Earl, Alhambra, Calif., assignor, by mesne assignments, to Physical Sciences Corporation, a corporation of California
Filed Apr. 11, 1960, Ser. No. 21,525
23 Claims. (Cl. 106—49)

This application constitutes a continuation-in-part of application Serial No. 847,082 (now abandoned), filed October 19, 1959, for an "Improved Ceramic Material."

This invention relates to ceramic materials used as a metal coating or as a high-temperature compression seal, and, more particularly, to an improved ceramic material for use where exposure to the effects of the operation of a nuclear reactor is anticipated. The invention also relates to novel methods of improving such materials.

It has been found that where ceramic materials are employed, either as insulation material for coating electrically conductive metal, or to provide a hermetic seal where gases, such as helium, are contained under pressure, then after a period of exposure to the thermoneutrons generated by a nuclear reactor, the ceramic material loses its insulation properties, as well as its mechanical strength. The high temperature consequent to the functioning of the thermonuclear reactor also assists in deteriorating the ceramic material.

An object of this invention is the provision of a novel ceramic material which can be used without deterioration in an environment where exposure to the operation of a nuclear reactor can be expected.

Yet another object of the present invention is the provision of a ceramic material which retains its electrical insulating properties, as well as its mechanical strength, despite exposure to the effects of a nuclear reactor.

Still another object fo the present invention is the provision of a novel and useful ceramic material which can be employed for electrical insulation or for the purposes of the compression seal at elevated temperatures, without deteriorating.

In the drawings:

FIGURE 1 shows a plurality of curves illustrating the relationship between temperature and the thermal coefficient of expansion for silica, a mixture containing silica and cerium oxide, a mixture containing silica and molybdenum oxide and a mixture containing silicon and the oxides of cerium and molybdenum;

FIGURE 2 provides a table illustrating the raw weights of various materials which have been used in producing representative ceramics included within the scope of this invention; and FIGURE 3 provides a table illustrating the equivalent proportions of the different oxides which have been used in producing the representative ceramics included within the scope of this invention and formed from the mixtures shown in FIGURE 2.

These and other objects may be achieved in accordance with this invention by a ceramic material which is substantially boron free. Upon investigation it has been found that boron has a high capture effect of thermoneutrons, which causes a deterioration of the electrical and mechanical properties of the ceramic material of which the boron is a part. In accordance with this invention, boron is replaced by bismuth. The thermoneutron capture effect of the material is thereby considerably lowered to the point where it does not affect the material adversely. In addition, other materials are used whereby the resulting ceramic material is essentially helium leak tight, providing a hermetic seal, and having excellent electrical insulation properties, as well as resisting mechanical deformation at temperatures as high as 1200° F.

The novel features that are considered characteristic of this invention are set forth with particularity in the appended claims. The invention itself, both as to its organization and method of operation, as well as additional objects and advantages thereof, will best be understood from the following description.

In accordance with this invention, there is initially provided a mixture of materials by weight as follows: 38 to 57% of 97% grade red lead ($Pb_3O_4$), which when heated becomes lead oxide (PbO); 0 to 5% of zinc oxide (ZnO); 0 to 5% of aluminum oxide ($Al_2O_3$); 5 to 13% of bismuth trioxide ($Bi_2O_3$); 20 to 34% of silicon dioxide ($SiO_2$); 0 to 9% of cerium dioxide ($CeO_2$); 0 to 5% of molybdenum trioxide ($MO_3$); and 0 to 4% of lanthanum oxide ($La_2O_3$). After thoroughly mixing these materials, they are smelted at a temperature in the order of 2100° F. until they become homogenized. Since the smelting operation occurs in air and since all of the materials constitute oxides, the smelting operation can be considered to occur in an oxidizing atmosphere. The smelt is then quenched in water. Thereafter, this is wet ground and passed through a suitable screen such as a 400-mesh screen. The material can then be used as a slip for spraying on stainless steel or other conducting metal, for example, to form an electrical insulation coating.

The residue, after passing through the 400-mesh screen, can be dried and then sintered. It will be appreciated, however, that the sintering step is not required. After sintering, it can be processed into beads or some other form which is desired, suitable for a hermetic seal or for a feed-through bead where it is desired to pass an electrical connection through a shield of metal or some other material, which connection must be insulatingly as well as hermetically supported in the opening through which the electrical connection is passed.

A preferred composition of the material comprises 47 parts by weight of the 97% grade red lead, 4 parts by weight of the zinc oxide, 2 parts by weight of the aluminum oxide, 10 parts by weight of the bismuth trioxide, 30 parts by weight of the silicon dioxide, 1 part by weight of the cerium dioxide, 3 parts by weight of the molybdenumtrioxide, and 3 parts by weight of the lanthanum oxide. This mixture is melted at approximately 2100° and quenched in water. Thereafter, it is wet ground and passed through the 400-mesh screen. It can be prepared as a slip for either spraying or coating purposes. It is fired at a temperature on the order of 1500° F. to 1600° F. Otherwise, it can be dried and then subsequently melted to be formed into beads or any other suitable shape. Although the ceramic described in this paragraph constitutes a preferred composition of material, other preferred compositions of material are also included within this invention. For example, a number of representative compositions are shown in FIGURES 2 and 3.

When used as an electrical coating, the coating has an electrical resistivity at room temperature on the order of $2 \times 10^{14}$ ohms and at 1200° F. the resistivity is $8 \times 10^7$ ohms. The coating has a maturing temperature in the order of 1200° F. As an indication of its hermetic sealing properties when subjected to the pressure of helium, it has a leak rate in the order of $10^{-10}$ to $10^{-12}$ cc./sec. The seal is also able to withstand pressures of at least 1500 pounds per square inch at a temperature of approximately 1200° F. and certain configurations of the seal are able to withstand pressures considerably in excess of 1200 pounds per square inch.

Various materials capable of being used in forming ceramics may be generally divided as follows into three group or categories:

Glass modifiers:
    Lithium oxide ($Li_2O$)
    Sodium oxide ($Na_2O$)
    Potassium oxide ($K_2O$)
    Lead oxide (PbO)
    Zinc oxide (ZnO)
    Strontium oxide (SrO)
    Barium oxide (BaO)
    Calcium oxide (CaO)
    Magnesium oxide (MgO)
Glass formers:
    Arensic oxide ($As_2O_3$)
    Boron oxide ($B_2O_3$)
    Bismuth oxide ($Bi_2O_3$)
    Aluminum oxide ($Al_2O_3$)
    Lanthanum oxide ($La_2O_3$)
Glass acid:
    Silicon dioxide ($SiO_2$)
    Cerium dioxide ($CeO_2$)
    Zirconium dioxide ($ZrO_2$)
    Titanium dioxide ($TiO_2$)
    Molybdenum trioxide ($MoO_3$)

It will be appreciated that the listing of some of the materials may be considered as somewhat arbitrary since these materials may be considered by some people as belonging in a different one of the lists than set forth above. However, the listing of the materials as set forth above will be considered as proper by many of the experts in the art. It will also be appreciated that other materials may also be included in each of the different categories. For example, the oxides of copper, silver and lead may be included in the first category designated as the glass modifiers. These additional materials have not been included because they have low electrical resistivities and because at least some of these materials will even act as electrical conductors in colloidal solutions.

The glass modifiers may in general be considered as having alkaline properties and the properties of a base. The glass modifiers may be further considered as having a chemical formula which may be designated as $R_2O$ or RO, where R indicates the element forming the compound with the oxygen (O). The alkalinity of the element in combination with oxygen in the glass forming category or group tends to decrease progressively down the list, as does the reactivity of the compound with an acid. The electrical resistivity of the material at any particular temperature tends to increase progressively down the list. The melting temperature of the compounds in the glass modifiers tends to increase progressively down the list. No definite pattern as to the thermal coefficient of expansion of the oxides in the first category occurs with progressive listings in this category.

The third category or group may be considered as glasses and as having acidic properties. The chemical formula of these glasses may be expressed as $RO_2$ or $RO_3$, where R is the element forming the glass compound with the oxygen. The melting temperatures of the different oxides included in the third category or group tend to increase progressively down the list although the melting temperature of all of the oxides in the third category are relatively high. The reactivity of the different oxides in the third category with acids tends to increase progressively down the list. No definite pattern as to the thermal coefficient of expansion of the oxides in the third category occurs with progressive listings in the category.

The second category or group of compounds may be designated as glass formers in that the compounds in the second category tend to react with the compounds in the third category to form the ceramic materials. The compounds in the second category or group may be designated by the chemical formula $R_2O_3$, where R indicates the element forming the compound with the oxygen. The glass formers are intermediate in chemical and physical properties to the glass modifiers and to the glasses. For example, the glass formers may react chemically with either acidic or alkaline materials. The acid resistivity of the different oxides in the second category tends to increase progressively down the list, as does the melting temperature of the different oxides in this category. No definite pattern tends to exist as to the thermal coefficient of expansion of the different oxides listed progressively in the second category.

The ceramics constituting this invention are formed by combining materials from each of the three categories set forth above. The particular materials used and the properties of such materials are dependent upon the characteristics desired for the ceramics such as glass to be produced from the material. For example, such characteristics as the melting temperature of the ceramic, the acid resistance of the ceramic, the thermal coefficient of expansion of the ceramic for different temperatures and the electrical resistivity of the ceramic at different temperatures may be controlled by varying the particular materials used and by varying the proportions of such materials. Although the ceramics constituting this invention may be used as glasses, they can be also used as coatings or glazes and designated as "enamels."

As a general rule, the ceramics such as glass constituting this invention employ four compounds not previously cluded in the mixtures for forming the ceramics constituting muth, lanthanum, cerium and molybdenum. It will be appreciated from the subsequent discussion, however, that certain substitutions may even be made for these four materials without departing from the scope of the invention. As previously described, the bismuth oxide is included in the mixture for producing the ceramics constituting this invention because it has a low tendency to capture thermoneutrons, especially in comparison to the oxide of boron previously included in mixtures for making comparable ceramics. The other oxides included in the formation of the ceramics also have a low tendency to capture thermoneutrons, especially in the proportions in which the compounds are included in the ceramics. In this way, the ceramics constituting this invention do not tend to deteriorate as to such properties as electrical resistivity when exposed to thermonuclear bombardment. The ceramics constituting this invention are especially advantageous at elevated temperatures since they do not deteriorate under thermonuclear bombardment at elevated temperatures whereas ceramics previously in use have deteriorated quickly under thermonuclear bombardment at elevated temperatures.

The lanthanum also has certain advantages when included in the mixtures for forming the ceramics constituting this invention. One advantage results from the fact that the lanthanum oxide tends to replace such oxides as the oxide of sodium in the mixtures for forming the ceramics constituting this invention. By replacing the oxide of sodium with the oxide of lanthanum in the mixtures, alkaline-free ceramics are obtained. This prevents the ceramics including the lanthanum from being semiconductors and tends to increase the electrical resistivity of the ceramics. The lanthanum is also instrumental in creating a ceramic material which has good stiffness and which is relatively viscous. A ceramic having an enhanced viscosity is desirable to produce a good hermetic or vacuum seal relative to a metallic member such as an electrical terminal.

The oxide of bismuth is also used in combination with the oxides of lanthanum and cerium to produce a distinctive yellow color, and the oxide of molybdenum is included in the mixture to impart an opacity to the yellow color. The shade of the yellow color is dependent upon the particular proportions of the lanthanum, cerium and bismuth included in the ceramics constituting this invention. The use of cerium to impart a distinctive color to the ceramics constituting this invention may be somewhat unusual since cerium has been previously used to eliminate color.

The oxides of cerium and molybdenum have been included for certain other important reasons which may perhaps be best seen by reference to the curves shown in FIGURE 1. As will be seen from FIGURE 1, the thermal coefficient of expansion of ordinary glass remains fairly stable until a temperature of approximately 750 degrees Fahrenheit (750° F.). The thermal coefficient of expansion of the ordinary glass using silica then increases at a rapid rate which increases in temperature above 750° F. This is undesirable, especially when the ordinary glass is formed around a member such as a metal to hermetically seal the metal. The reason is that the glass expands excessively at elevated temperatures so as to break the hermetic seal with the electrical conductor.

When the oxide of cerium is used in combination with the silica in the mixture producing the ceramics constituting this invention, the thermal coefficient of expansion of the ceramics remains fairly stable to temperatures of approximately 1000° F. The thermal coefficient of expansion also remains relatively stable through a range of approximately 1100° F. when the oxide of molybdenum is used in a mixture with silica to obtain the ceramics constituting this invention. The stability in the thermal coefficient of expansion of the ceramics constituting this invention is extended through even an increased temperature range when the oxide of molybdenum is included in a mixture with the oxides of cerium and silicon in making the ceramics constituting this invention. For example, the thermal coefficient of expansion remains fairly stable through a range of approximately 1200° F. when the oxides of molybdenum, cerium and silicon are included in a mixture for forming the ceramics constituting this invention. Similar properties have also been obtained by including the oxides of titanium and zirconium or by substituting these oxides in the mixture for the oxides of cerium and molybdenum. The oxides of titanium and zirconium may especially be substituted for the oxides of cerium and molybdenum when a truly yellow color for the resultant ceramic is not required. For example, a yellow color with buff overtones may be produced for the ceramic by including titanium in the ceramic.

The ceramics including cerium and molybdenum as constituents are also advantageous for certain other important reasons. One additional advantage results from the fact that the chemical resistivity of the ceramics including cerium and molybdenum to acids are considerably enhanced over that obtained for previous materials. Another advantage is obtained because the ceramics obtained by including molybdenum in the mixture provide a good chemical bond to metal. This chemical bond is desirable when the ceramic is associated with an electrical terminal to provide a hermetic seal around the terminal. Molybdenum is used in place of cobalt in the ceramic because cobalt has such a long half life that it is not desirable to include it in nuclear reactors.

Another advantage is obtained because of the particular manner in which the oxide of molybdenum has been added to the mixture to obtain the ceramics constituting this invention. For example, any compound including an oxide or salt or carbonate of molybdenum previously included in ceramics has been added after the smelting operation and before the milling operation. As a mill addition, the oxide of molybdenum will sublime (change from a solid to a vapor without going through a liquid state) at a temperature of approximately 1400° F. This has prevented the ceramics containing molybdenum from being produced at temperatures above approximately 1400° F. since the molybdenum would otherwise volatilize. Since temperatures above approximately 1400° F. have not been previously able to be used in producing ceramics containing molybdenum, such ceramics have not had the characteristics individual to the ceramics constituting this invention.

In producing the ceramics constituting this invention, the oxide of molybdenum has been added to the mixture before the smelting operation because of the observation that the molybdenum does not sublime until a temperature in excess of 2100° F. during the smelting operation. Since the molybdenum does not sublime until a temperature in excess of approximately 2100° F. during the smelting operation, the molybdenum and the other materials producing the ceramic have been able to be smelted at a temperature approaching 2100° F. Such a smelting operation at 2100° F. has occurred for approximately an hour.

Aluminum oxide has also been included in the mixtures for producing the ceramics constituting this invention. Preferably, the oxide of aluminum has been included in the ratio of approximately one (1) part of weight of the oxide of aluminum to approximately thirteen (13) parts by weight of the oxide of silicon. The aluminum and silicon have been preferably included in this ratio because a eutectic point has occurred when the aluminum and silicon have been mixed in the proper proportions of 1:13. This eutectic point has caused the melting point of the mixture of aluminum and silicon to be reduced considerably below the melting point of either aluminum or silicon alone.

As will be seen from Figure 117 of "Phase Diagram for Ceramists" published by the American Ceramic Society As will be seen from FIGURE 117 of "Phase Diagram for Geramists" published by the American Ceramic Society in 1956, the melting point of the mixture of aluminum and silicon in the ratio of approximately 1:13 approaches the smelting temperature of approximately 2100° F. described above. A reduced melting point of the mixture of aluminum and silicon is desirable because the fusion between the two elements becomes considerably enhanced at the reduced temperatures. It will be appreciated, however, from the table shown in FIGURE 3 that the exact eutectic ratio between the aluminum and silicon is not used for all of the ceramics constituting this invention.

The inclusion of the oxide of aluminum in the mixtures for forming the ceramics constituting this invention is also advantageous for certain other reasons. For example, the inclusion of the oxide of aluminum in small amounts enhances the chemical resistivity of the resultant ceramics to acids. By including the oxide of aluminum, the stiffness and viscosity of the ceramic become enhanced. As previously described, a ceramic having an enhanced viscosity is desirable in obtaining a hermetic or vacuum seal with respect to a metallic member such as an electrical terminal.

FIGURES 2 and 3 illustrate a table of representative ceramics which are included in this invention and which are formed by the methods constituting this invention. It will be appreciated that the ceramics set forth in FIGURES 2 and 3 are only representative since a considerable number of different ceramics have actually been produced. It will also be appreciated that the numerals setting forth the different amounts of materials represent percentages by weight and that substitutions may be made in the amounts of such materials without departing from the scope of the invention. For example, although red lead ($Pb_3O_4$) has been used because it liberates free oxygen, an equivalent amount of different forms of lead compounds such as litharge (PbO), white lead $$[2PbCO_3.Pb(OH)_2]$$

lead monosilicate ($PbSiO_3$), lead bisilicate [$PbO.2(SiO_2)$] or lead trisilicate may be used. Because of this, claims setting forth ranges of elements are considered to include equivalent amounts of different forms of the same elements within the scope of the claims.

As will be seen from the table set forth in FIGURE 3, certain oxides have been used in all of the representative mixtures for producing the ceramics included within the scope of this invention. For example, an oxide of lead, the oxide of silicon and the oxide of bismuth have been included in all of the representative mixtures set forth in FIGURE 3. The oxide of lead has been included in the range of approximately 38% to 57% by weight although percentages as low as approximately 31% and below and as high as approximately 58% and above have been used in other mixtures for producing ceramics within the scope of this invention. The oxide of bismuth has been included in the range of approximately 5% to 13% in the representative mixtures set forth in FIGURE 3 although proportions outside of this range have also been included in mixtures for forming ceramics constituting this invention. The oxide of silicon has been included in the range of approximately 20% to 32% by weight although proportions of the oxide of silicon as high as approximately 34% and above have also been used and proportions less than 20% can be used.

Cerium oxide has also been included in a number of the representative mixtures for producing ceramics within the scope of this invention. The cerium oxide has been used in the range of approximately 1% to 9% by weight although some ceramics within the scope of this invention have been used without any cerium and although cerium oxide in excess of 9% by weight can also be used. The oxides of molybdenum and lanthanum have also been included in some of the representative mixtures shown in FIGURE 3, these oxides being included in the range of approximately 2% to 5% by weight.

The oxide of magnesium has been included in the last representative mixture in FIGURE 3 without any oxides of zinc and barium, and the oxide of zinc has been included in the next-to-last representative mixture in FIGURE 3 without any oxides of magnesium and barium. All of the other representative mixtures in FIGURE 3 have included barium oxide without any oxides of zinc and magnesium, the barium oxide being included in the range of approximately 4% to 14% by weight. It should be appreciated that different combinations of the oxides of zinc and magnesium and the carbonate of barium may also be used and that the proportions may vary from those shown in FIGURE 3.

It will be appreciated that the proportions of the materials shown in FIGURE 3 represent a conversion from the actual materials used in FIGURE 2. For example, the proportions of barium oxide shown in the table in FIGURE 3 represent a conversion from the barium carbonate actually used, the proportions of the barium carbonate actually used being shown in FIGURE 2.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In a high-temperature compression-seal material suitable for use with nuclear reactors, a boron-free ceramic material made from a mixture which has been smelted, quenched, wet ground, and fired, said mixture consisting of from 31 to 58 percent by weight of the oxide of lead, the presence up to about 5 percent by weight of zinc oxide, the presence up to about 5 percent by weight of aluminum oxide, from 5 to 13 percent by weight of bismuth trioxide, from 20 to 34 percent by weight of silicon dioxide, the presence up to about 9 percent by weight of cerium dioxide, the presence up to about 5 percent by weight of molybdenum trioxide, and up to about 4 percent by weight of lanthanum oxide; said oxides constituting a glass.

2. In a high-temperature hermetic-seal material comprising a ceramic material having a low thermonuclear capture effect and made from a mixture which is smelted, quenched, wet ground, and fired: substantially 47 parts by weight of 97% grade red lead, substantially 4 parts by weight of zinc oxide, substantially 2 parts by weight of aluminum oxide, substantially 10 parts by weight of bismuth trioxide, substantially 30 parts by weight of silicon dioxide, substantially 1 part by weight of cerium dioxide, substantially 3 parts by weight of molybdenum trioxide, and substantially 3 pars by weight of lanthanum oxide; said oxides constituting a glass.

3. An electrical insulating ceramic coating for metal which has been applied to said metal as a slip and then fired, said slip being a glass frit having a low thermonuclear capture effect and made from a mixture of substantially 47 parts by weight of 97% grade red lead, substantially 4 parts by weight of zinc oxide, substantially 2 parts by weight of aluminum oxide, substantially 10 parts by weight of bismuth trioxide, substantially 30 parts by weight of silicon dioxide, substantially 1 part by weight of cerium dioxide, substantially 3 parts by weight of molybdenum trioxide, and substantially 3 parts by weight of lanthanum oxide.

4. In a ceramic material having properties of electrical insulation and having a low thermonuclear capture effect: the oxide of lead in the relative proportion of 37.78% by weight, the oxide of barium in the relative proportion of 13.90% by weight, the oxide of aluminum in the relative proportion of 2.10%, the trioxide of bismuth in the relative proportion of 12.62% by weight, the dioxide of silicon in the relative proportion of 27.34% by weight, and the dioxide of cerium in the relative proportion of 5.26% by weight; said oxides constituting a glass.

5. In a ceramic material having the properties of electrical insulation and having a low thermonuclear capture effect: the oxide of lead in the relative percentage of 57.10% by weight, the oxide of barium in the relative percentage of 4.0% by weight, the trioxide of bismuth in the relative percentage of 5.15% by weight, the dioxide of silicon in the relative percentage of 31.70% by weight, and the dioxide of cerium in the relative percentage of 2.05% by weight; said oxides constituting a glass.

6. In a ceramic material having the properties of electrical insulation and having a low thermonuclear capture effect: the oxide of lead in the relative percentage of 47% by weight, the oxide of aluminum in the relative percentage of 2% by weight, the trioxide of bismuth in the relative percentage of 10% by weight, the dioxide of silicon in the relative percentage of 30% by weight, the dioxide of cerium in the relative percentage of 1% by weight, and the oxide of zinc in the relative percentage of 4% by weight; said oxides constituting a glass.

7. In a ceramic material having the properties of electrical insulation and having a low thermonuclear capture effect: the oxide of lead in the relative percentage of 54.3% by weight, the oxide of aluminum in the relative perecntage of 1.8% by weight, the trioxide of bismuth in the relative percentage of 10.2% by weight, the dioxide of silicon in the relative percentage of 20.2% by weight, the dioxide of cerium in the relative percentage of 9.0% by weight, and the oxide of magnesium in the relative percentage of 4.5% by weight; said oxides constituting a glass.

8. In a ceramic material having the properties of electrical insulation and having a low thermonuclear effect: the oxide of lead in the relative percentage of 42.10% by weight, the oxide of barium in the relative perecntage of 7.07% by weight, the oxide of aluminum in the relative percentage of 1.86% by weight, the trioxide of bismuth in the relative percentage of 9.20% by weight, the dioxide of silicon in the relative percentage of 27.58% by weight, the dioxide of cerium in the relative percentage of 2.28% by weight, the trioxide of molybdenum in the relative percentage of 2.68% by weight, the oxide of lanthanum in the relative percentage of 2.68% by weight, and the dioxide of zirconium in the relative percentage of 4.55% by weight; said oxides constituting a glass.

9. In a ceramic material having properties of electrical insulation and having a low thermonuclear capture effect:
   silica in about 20% to 34% by weight;
   at least one material from the group consisting of the oxides of cerium, zirconium, titanium and molybdenum present to approximately 9% by weight;
   the oxide of bismuth in about 5% to 13% by weight;
   the oxide of aluminum present to approximately 5% by weight;
   the oxide of lanthanum present to approximately 4% by weight; and
   the oxide of lead in about 31% to 58% by weight;
   said oxides constituting a glass.

10. In a ceramic material having properties of electrical insulation and having a low thermonuclear capture effect:
    bismuth in about 5% to 13% by weight to provide a low thermonuclear capture effect;
    silica in about 20% to 34% by weight;
    at least one of the group consisting of the oxides of cerium, molybdenum, zirconium and titanium present to about 9% by weight; and
    the oxide of lead in about 31% to 58% by weight;
    said oxides constituting a glass.

11. In a ceramic material having properties of electrical insulation and having a low thermonuclear capture effect:
    silica in about 20% to 34% by weight;
    lead oxide in about 31% to 58% by weight;
    bismuth oxide in about 5% to 13% by weight; and
    lanthanum oxide present to about 4% by weight to provide the ceramic material with alkaline-free properties;
    said oxides constituting a glass.

12. In a ceramic material having properties of electrical insulation and having a low thermonuclear capture effect:
    at least one of the oxides of zinc, barium, strontium, calcium and magnesium with up to about 14% by weight;
    the oxide of bismuth in about substantially 5% to 13% by weight to provide a low thermonuclear capture effect;
    the oxide of lanthanum present to about 4% by weight;
    the oxide of aluminum present to about 5% by weight;
    the oxide of lead in about 31% to 58% by weight;
    silica in about 20% to 34% by weight; and
    at least one of the oxides of cerium, zirconium, titanium and molybdenum present to about 9% by weight;
    said oxides constituting a glass.

13. In a ceramic material having properties of electrical insulation and having a low thermonuclear capture effect:
    the oxide of bismuth with a relative weight of about 5% to 13%;
    the oxide of lead with a relative weight of about 31% to 58%; and
    the oxide of silicon with a relative weight of about 20% to 34%;
    said oxides constituting a glass.

14. In a ceramic material having properties of electrical insulation and having a low thermonuclear capture effect:
    the oxide of lead in about 31% to 58% by weight;
    the oxide of bismuth in about 5% to 13% by weight;
    silica in about 20% to 34% by weight;
    the oxide of aluminum present to about 5% by weight; and
    the oxide of lanthanum present to about 4% by weight;
    said oxides constituting a glass.

15. In a method of forming a ceramic material having properties of electrical insulation and having a low thermonuclear capture effect, the steps of,
    forming a mixture including the following oxides as constituents:
      bismuth in about 5% to 13% by weight,
      lead in about 31% to 58% by weight,
      silicon in about 20% to 34% by weight,
      at least one additional element from a group consisting of cerium, zirconium, titanium and molybdenum present to about 9% by weight;
    smelting the mixture at a temperature of about 2100° F. in an oxidizing atmosphere for a sufficient period of time to homogenize the mixture; and
    quenching the homogenized mixture to facilitate the shattering of the mixture into particles.

16. In a method of forming a ceramic material having properties of electrical insulation and having a low thermonuclear capture effect, the steps of,
    forming a mixture including as constituents oxides of the following elements:
      lead in about 31% to 58% by weight,
      bismuth in about 5% to 13% by weight, and
      silicon in about 20% to 34% by weight;
    smelting the mixture at a temperature of about 2100° F. in an oxidizing atmosphere for a sufficient time to homogenize the mixture; and
    quenching the homogenized mixture to facilitate the shattering of the mixture into particles.

17. In the method set forth in claim 16, the oxide of lanthanum being included to about 4% by weight and the oxide of aluminum being included to about 5% by weight.

18. In a method of forming a ceramic material having properties of electrical insulation and having a low thermonuclear capture effect, the steps of,
    forming a mixture including as constituents oxides of the following elements:
      bismuth having a weight of about 5% to 13%,
      silicon having a weight of about 20% to 34%,
      lead having a weight of about 31% to 58%,
      at least one element selected from a group consisting of zinc, strontium, barium, calcium and magnesium and having a weight up to about 14%;
    smelting the mixture at a temperature in the order of 2100° F. in an oxidizing atmosphere for a sufficient time to homogenize the mixture; and
    quenching the homogenized mixture to facilitate the shattering of the mixture into particles.

19. In a ceramic mixture having properties of electrical insulation and having a low thermonuclear capture effect:
    the oxide of lead in about 31% to 58% by weight;
    the oxide of bismuth in about 5% to 13% by weight;
    the oxide of aluminum present to about 5% by weight; and
    the oxide of silicon in about 20% to 34% by weight;
    said oxides constituting a glass.

20. In a ceramic mixture having properties of electrical insulation and having a low thermonuclear capture effect:
    the oxide of lead in about 31% to 58% by weight;
    the oxide of at least one additional material from a groups consisting of zinc, strontium, barium, calcium and magnesium present to about 14% by weight;
    the oxide of bismuth in about 5% to 13% by weight;
    the oxide of lanthanum present to about 4% by weight;
    silica in about 20% to 34% by weight; and
    the oxide of at least one material from a group consisting of cerium, zirconium, titanium and molybdenum present to about 9% by weight;
    said oxides constituting a glass.

21. In the ceramic mixture set forth in claim 13, the oxide of at least one material selected from the group consisting of zinc, strontium, barium, calcium and magnesium and having a weight to about 14% and the oxide of at least one material selected from the group consisting of cerium, zirconium, titanium and molybdenum and having a weight to about 9%.

22. In a ceramic mixture having properties of electrical insulation and having a low thermonuclear capture effect:
  the oxide of lead in about 31% to 58% by weight;
  at least one additional oxide from the group consisting of zinc, barium, calcium, strontium and magnesium present to about 14% by weight;
  the oxide of bismuth in about 5% to 13% by weight;
  silica in about 20% to 34% by weight; and
  the oxide of aluminum present to about 5% by weight;
  said oxides constituting a glass.

23. The ceramic mixture set forth in claim 22 in which the oxide of lanthanum is included to about 4% by weight.

References Cited by the Examiner

UNITED STATES PATENTS

| | | | |
|---|---|---|---|
| 2,397,004 | 3/1946 | Harbert et al. | 106—49 |
| 2,477,329 | 7/1949 | De Gier et al. | 106—53 X |
| 2,508,511 | 5/1950 | Goodman | 106—49 |
| 2,588,920 | 3/1952 | Green | 106—49 |
| 2,643,020 | 6/1953 | Dalton | 106—53 X |
| 2,717,946 | 9/1955 | Peck | 106—49 |
| 2,771,375 | 11/1956 | Foraker | 106—49 |

HELEN M. McCARTHY, *Acting Primary Examiner.*

JOSEPH REBOLD, JOHN R. SPECK, TOBIAS E. LEVOW, *Examiners.*

D. J. ARNOLD, *Assistant Examiner.*